No. 786,023.

Patented March 28, 1905.

UNITED STATES PATENT OFFICE.

GEORGE W. GESNER, OF NEW YORK, N. Y.

PAINT.

SPECIFICATION forming part of Letters Patent No. 786,023, dated March 28, 1905.

Application filed June 21, 1904. Serial No. 213,554.

*To all whom it may concern:*

Be it known that I, GEORGE W. GESNER, a citizen of the United States, residing in the borough of Manhattan, in the city and State of New York, have invented a new and useful Improvement in Paints or Pigments, of which the following is a specification.

My invention relates to the manufacture of a paint or pigment composed of an alloy of hydrogen and iron, finely comminuted, the hydrogen being present in the alloy in such quantity as to prevent the action of all oxidizing agents, and linseed or other oil or vehicle, suitable to give the proper consistence for use. A drier is added when desired.

In using linseed-oil the proportions are about one gallon of mixed raw and boiled linseed-oil to thirty-three pounds of the alloy in a powdered state.

The paint can be applied in the manner of any paint. It flows freely and covers well and possesses great power of resisting corrosive influences. It will be of special value for the preservation of structural iron, sheet-iron for roofing, ships' bottoms, bridges, &c.

The manufacture of the alloy is generally set forth in Letters Patent to me, No. 604,580, dated May 24, 1898; No. 642,320, dated January 30, 1900; No. 646,552, dated April 3, 1900; No. 647,960, dated April 24, 1900; No. 649,049, dated May 8, 1900; No. 651,033, dated June 5, 1900; No. 670,775, dated March 26, 1901. These Letters Patent disclose in detail the alloy and processes and apparatus for making the same.

It will suffice in the present case to state that the alloy of iron and hydrogen is produced from iron, ore, steel, manufactured scrap or any other iron, and hydrogen. The association or combination of the hydrogen is stable under all conditions of heat. It resists oxidation that might be induced through any cause.

The alloy is produced by exposing the iron in a converter at a temperature of about 1,800° Fahrenheit to an atmosphere of hyrogen generated by steam injected into the converter from a steam-boiler through a coil of iron pipe constituting the hydrogen-generator and heated either in a separate furnace or in the furnace in which the alloy is made. Another mode of producing the alloy is to expose scrap-iron to hydrogen in the converter and remove the scale formed upon it by stirring-bars inserted through the converter side. Another mode is to force the hydrogen through molten iron. Any of these modes can be followed by a further process of grinding and screening, the resulting iron alloy being thus reduced to a fine powder. This powder produced by the grinding and screening of the alloy, made by whichever mode, is the form of the alloy used in the manufacture of the paint. The powder thus produced is either reground with the linseed or other oil or vehicle or simply mixed with it.

I do not show any special apparatus for the grinding together or mixing the powdered alloy and the oil or other vehicle, as any ordinary paint-mill or any vessel for mixing is suitable for that purpose.

The alloy can be pounded in a mortar or crushed by stamps as well as ground before being screened.

I claim as my invention—

1. The paint described, composed of a liquid vehicle with a drier, and an alloy of hydrogen and iron in a pulverized state, the hydrogen being in such proportion as to prevent oxidation or corrosion in the said alloy.

2. A paint composed of a pulverized alloy of hydrogen and iron, the hydrogen being present in such proportion as to prevent oxidation or corrosion in the said alloy, and linseed-oil.

3. A paint composed of a pulverized alloy of iron and hydrogen, the hydrogen being present in the alloy in the proportion of about eleven one-hundredths of one per cent. and upward, a vehicle and a drier.

In testimony that I claim the invention above set forth I affix my signature in presence of two witnesses.

GEORGE W. GESNER.

Witnesses:
MAY R. RAYNOR,
THOMAS DREW STETSON.